United States Patent
Hamada et al.

(10) Patent No.: US 9,344,630 B2
(45) Date of Patent: May 17, 2016

(54) IMAGING APPARATUS, IMAGING METHOD AND RECORDING MEDIUM

(75) Inventors: Akira Hamada, Sagamihara (JP); Tomoharu Yamaguchi, Kodaira (JP)

(73) Assignee: CASIO COMPUTER CO., LTD., Tokyo (JP)

(*) Notice: Subject to any disclaimer, the term of this patent is extended or adjusted under 35 U.S.C. 154(b) by 958 days.

(21) Appl. No.: 13/205,725

(22) Filed: Aug. 9, 2011

(65) Prior Publication Data
US 2012/0050579 A1   Mar. 1, 2012

(30) Foreign Application Priority Data

Aug. 31, 2010  (JP) ................................ 2010-193135

(51) Int. Cl.
  *H04N 5/232* (2006.01)
  *G03B 17/20* (2006.01)
  *G03B 17/40* (2006.01)

(52) U.S. Cl.
  CPC ............ *H04N 5/23293* (2013.01); *G03B 17/20* (2013.01); *G03B 17/40* (2013.01)

(58) Field of Classification Search
  CPC ..... H04N 5/23293; G03B 17/40; G03B 17/20
  USPC .............................. 348/333.99, 211.9, 240.99
  See application file for complete search history.

(56) References Cited

U.S. PATENT DOCUMENTS

| 7,936,384 B2 | 5/2011 | Sawachi |
| 8,269,851 B2* | 9/2012 | Hada .......................... 348/222.1 |
| 2002/0071042 A1* | 6/2002 | Enomoto ...................... 348/222 |
| 2008/0079824 A1* | 4/2008 | Sawachi .................... 348/240.1 |

(Continued)

FOREIGN PATENT DOCUMENTS

| CN | 1630342 A | 6/2005 |
| JP | 2002-033949 A | 1/2002 |

(Continued)

OTHER PUBLICATIONS

Japanese Office Action dated Jan. 4, 2012 (and English translation thereof) in counterpart Japanese Application No. 2010-193135.

(Continued)

*Primary Examiner* — Roberto Velez
*Assistant Examiner* — Tuan Le
(74) *Attorney, Agent, or Firm* — Holtz, Holtz & Volek PC

(57) ABSTRACT

In a digital camera, when a photographer holds the digital camera and decides an imaging area (the area currently being captured by live-view), a CPU performs a first imaging processing (temporary imaging). Next, when the photographer sets the digital camera on a suitable surface (such as a desk), and moves into the imaging area, the CPU moves the optical zoom further to the wide-angle side than during the temporary imaging, and performs a second imaging processing (actual imaging) after a self-timer reaches time up. Then, the CPU performs positioning between the temporarily captured image and the actually captured image, and clips an image of the imaging area defined by the temporarily captured image from the actually captured image. According to the present invention, the degree of freedom of a camera setting location during self-timer imaging is increased and an image including an intended imaging area is easily captured.

10 Claims, 5 Drawing Sheets

(56) References Cited

U.S. PATENT DOCUMENTS

| | | |
|---|---|---|
| 2009/0079844 A1* | 3/2009 | Suzuki .................. 348/222.1 |
| 2009/0185056 A1* | 7/2009 | Okamoto et al. ........ 348/240.99 |
| 2011/0025873 A1* | 2/2011 | Wang et al. ............. 348/222.1 |

FOREIGN PATENT DOCUMENTS

| | | | |
|---|---|---|---|
| JP | 2005-079915 A | 3/2005 |
| JP | 3750499 B2 | 12/2005 |
| JP | 2006-235060 A | 9/2006 |
| JP | 2007-166187 A | 6/2007 |
| JP | 2008-92008 A | 4/2008 |
| JP | 2008-136024 A | 6/2008 |
| JP | 2011-097344 A | 5/2011 |

OTHER PUBLICATIONS

Japanese Office Action dated Mar. 21, 2012 (and English translation thereof) in counterpart Japanese Application No. 2010-193135.

* cited by examiner

IMAGING APPARATUS, IMAGING METHOD AND RECORDING MEDIUM

CROSS-REFERENCE TO RELATED APPLICATION

This application is based upon and claims the benefit of priority from the prior Japanese Patent Application No. 2010-193135, filed Aug. 31, 2010, the entire contents of which is incorporated herein by reference.

BACKGROUND OF THE INVENTION

1. Field of the Invention

The present invention relates to an imaging apparatus capable of self-timer imaging, an imaging method and a recording medium.

2. Description of the Related Art

Conventional cameras with a self-timer are not very user-friendly. When the user does not have a tripod, the camera is required to be placed on the top surface of something, which makes it difficult for the user to set the viewing angle. For example, when the camera is placed on a low table, the photographer is required to set the viewing angle while peering into the camera in a crouched position. Also, when the camera is placed in a location where the back surface of the camera is blocked, such as against a wall or the shelf board of a book shelf, the photographer cannot go around behind the camera and so cannot operate it. Although this problem can be solved to a certain extent by a rotating-lens-type camera, other problems such as a mechanism-related cost problem occur.

In self-timer imaging, the viewing angle is set such that photographic subjects other than the photographer are included within the imaging field, and then the shutter button is depressed. Subsequently, the photographer runs to enter the imaging field as a photographic subject. At this time, if the position at which the photographer has entered is outside of the set viewing angle, the position of the overall photographic subject changes, and as a result the overall photographic subject does not fit within the set viewing angle.

Therefore, a technology to solve this problem has been proposed in, for example, Japanese Patent Application Laid-Open (Kokai) Publication No. 2008-092008. In this technology, when an photographic subject to be imaged by an imaging apparatus such as a digital camera does not fit within the imaging field, the photographic subject is detected (three-dimensionally), a warning is issued, and the viewing angle is automatically widened by zooming so that the photographic subject is unfailingly included within the imaging field.

However, all it does for unfailingly including a photographic subject within an imaging field is to automatically widen the viewing angle by zooming. Accordingly, this technology has a problem. For example, if the direction of the digital camera is shifted, a set viewing angle is shifted from the center of the imaging field, and as a result the photographic subject is shown on one side of the captured image rather than the center thereof. Also, if a photographic subject is forcibly included within an imaging field, the viewing angle is unnecessarily widened along with it. Therefore, an image with an intended set viewing angle cannot be acquired.

SUMMARY OF THE INVENTION

An object of the present invention is to provide an imaging apparatus, an imaging method and a recording medium storing a program therein by which the degree of freedom of a camera setting location during self-timer imaging is increased, and an image including an intended imaging area is easily captured.

In order to achieve the above-described object, in accordance with one aspect of the present invention, there is provided an imaging apparatus capable of imaging using a self-timer, comprising: an imaging section; an imaging area setting section which sets an imaging area; and an imaging control section which controls an image viewing angle of the imaging section based on the imaging area set by the imaging area setting section and performs imaging, when imaging using the self-timer is performed.

In accordance with another aspect of the present invention, there is provided an imaging method using a self-timer in an imaging apparatus including an imaging section, comprising: an imaging step of performing imaging by the imaging section; an imaging area setting step of setting an imaging area; and an imaging control step of controlling an image viewing angle of the imaging section based on the imaging area set in the imaging area setting step and performing imaging, when imaging using the self-timer is performed.

In accordance with another aspect of the present invention, there is provided a non-transitory computer-readable storage medium having stored thereon a program that is executable by a computer in an imaging apparatus capable of imaging using a self-timer, the program being executable by the computer to perform functions comprising: imaging processing; imaging area setting processing for setting an imaging area; and imaging control processing for controlling an image viewing angle for the imaging processing based on the imaging area set by the imaging area setting processing, and performing imaging, when imaging using the self-timer is performed.

According to the present invention, advantageous effects are achieved in that the degree of freedom of a camera setting location during self-timer imaging is increased, and an image including an intended imaging area can be easily captured.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The preferred embodiments of the present invention will hereinafter be described with reference to the drawings.

First Embodiment

Figure 1:
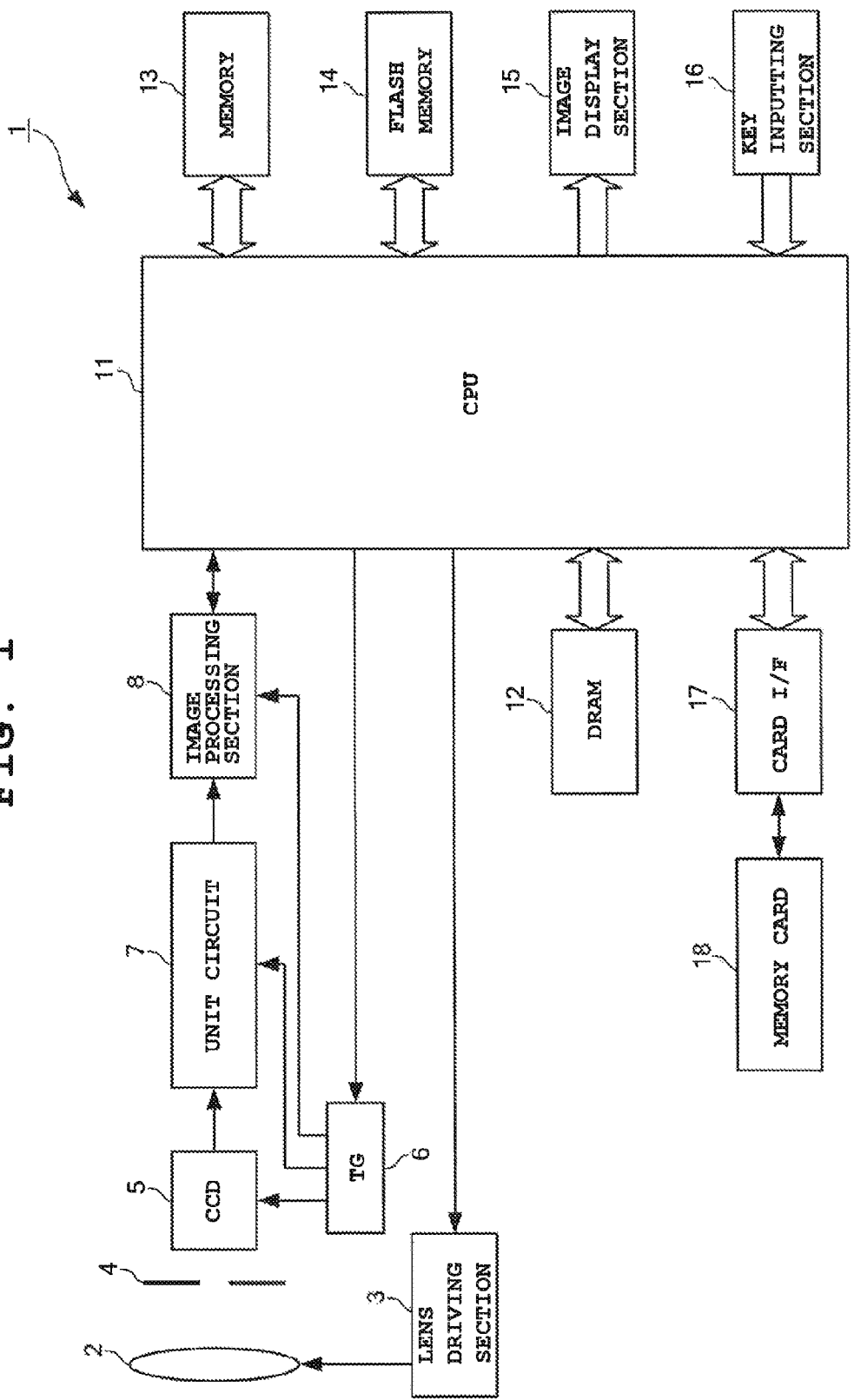
FIG. 1 is a block diagram showing the configuration of a digital camera according to a first embodiment of the present invention.

FIG. 1 is a block diagram showing the configuration of a digital camera according to a first embodiment of the present invention. In FIG. 1, a digital camera 1 includes an imaging lens 2, a lens driving section 3, a combined aperture/shutter 4, a charge-coupled device (CCD) 5, a timing generator (TG) 6, a unit circuit 7, an image processing section 8, a central processing unit (CPU) 11, a dynamic random access memory (DRAM) 12, a memory 13, a flash memory 14, an image display section 15, a key inputting section 16, a card interface (I/F) 17, and a memory card 18.

The imaging lens 2 includes a focus lens, a zoom lens, etc., and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The combined aperture/shutter 4 includes a driver circuit not shown, and the driver circuit operates the combined aperture/shutter 4 in accordance with control signals sent from the CPU 11. This combined aperture/shutter 4 controls the amount of light irradiated from the imaging lens 2. The CCD (image sensor) 5 (imaging section), which is driven in accordance with timing signals of a predetermined frequency generated by the TG 6, converts the light of a subject projected through the imaging lens 2 and the combined aperture/shutter 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the analog automatic-gain-controlled imaging signals to digital signals. Imaging signals from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and expansion processing of image data (such as compression and extension in Joint Photographic Experts Group (JPEG) format, Motion-JPEG [M-JPEG] format, or Moving Picture Experts Group (MPEG) format), processing for combining a plurality of captured images, etc.

The CPU 11 (imaging area setting section, imaging control section, image processing section, and confirmation section) is a single-chip microcomputer that controls each section of the digital camera 1. Particularly, in the first embodiment, the CPU 11 controls each section such that, when a user holds the digital camera 1 for self-timer imaging, and sets an "imaging area" by adjusting its direction and zoom setting, temporary imaging is performed and, after the digital camera 1 is set on a desk or the like and actual imaging is performed on a wide-angle side, the image of the "imaging area" set during the temporary imaging is clipped from the actually captured image. Note that the positioning of the actually captured image and the temporarily captured image, and the clipping of the image of the "imaging area" are performed by the comparison of their feature points. Details of self-timer imaging will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 includes a color liquid crystal display (LCD) and a driver circuit thereof. In an imaging stand-by state, the image display section 15 displays a photographic subject captured by the CCD 5 as a through image. Also, the image display section 15 displays a recorded image that has been read out from the flash memory 14 or the memory card 18 and expanded when it is replayed. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

Next, operations of the above-described first embodiment will be described.

Figure 2:
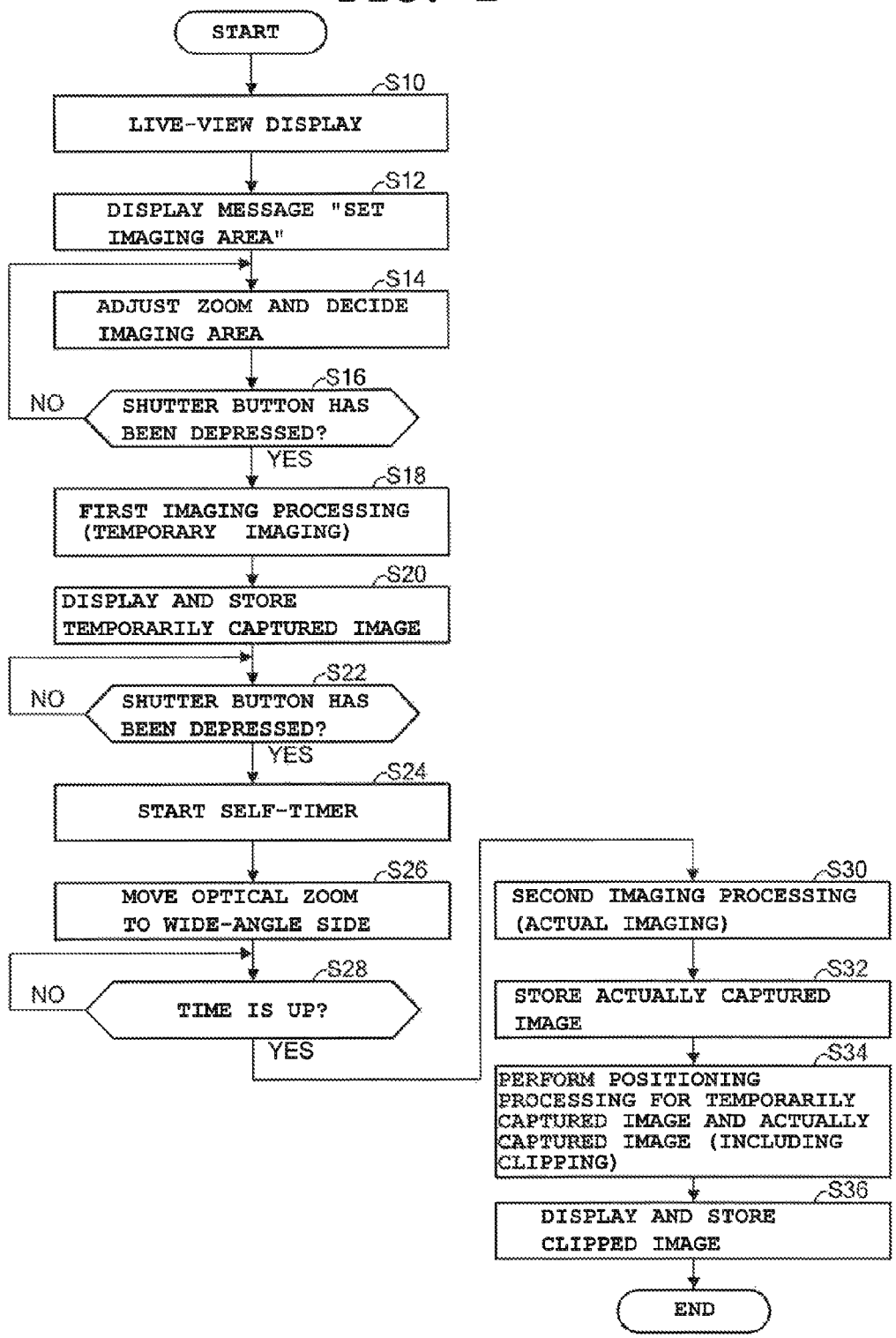
FIG. 2 is a flowchart for explaining operations of the digital camera according to the first embodiment.
Figure 3:
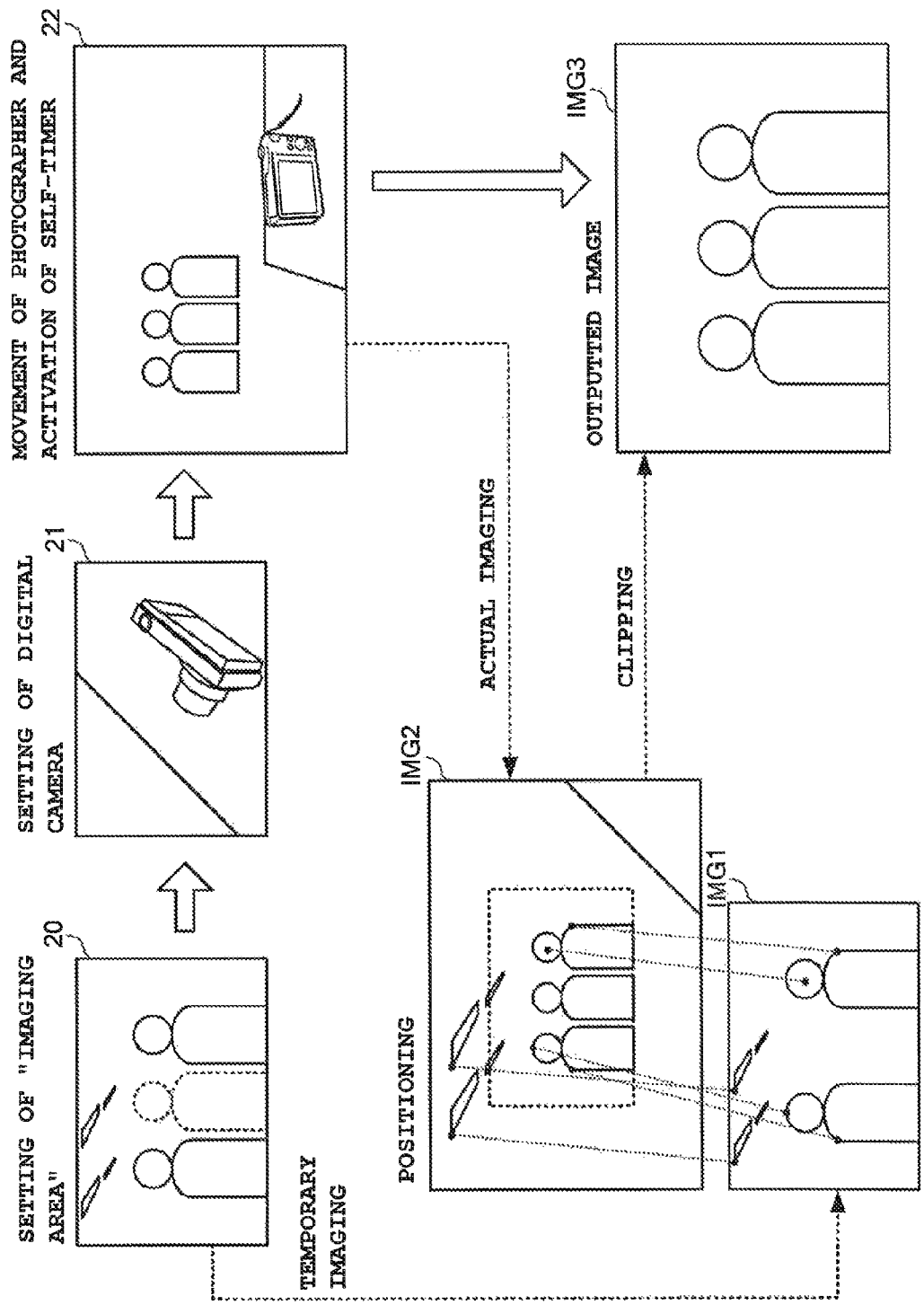
FIG. 3 is a conceptual diagram for explaining operations of the digital camera according to the first embodiment.

FIG. 2 is a flowchart for explaining the operations of the digital camera 1 according to the first embodiment. FIG. 3 is a conceptual diagram for explaining operations of the digital camera according to the first embodiment. When a photographer sets the digital camera 1 in "automatic-positioning self-timer mode", the digital camera 1 operates based on the following procedures. First, the CPU 11 changes the display of the image display section 15 to live-view display (Step S10) and displays the message "set imaging area" (Step S12). In response, the photographer holds the digital camera 1 and decides an "imaging area" (the area currently being displayed in live view) by determining its direction and adjusting the zoom setting (Step S14), as in the case of ordinary imaging. That is, the photographer decides an imaging area 20 such that the overall subject to be captured is included within the viewing angle, on the assumption that the photographer himself enters the viewing angle as a photographic subject, as shown in FIG. 3. In the imaging area 20, a portion shown by a broken line indicates a position to which the photographer moves. In the example in FIG. 3, the photographer moves to a position in the middle. However, the photographer may move to a position on the left or right end.

Next, the CPU 11 judges whether or not the photographer has depressed the shutter button (Step S16). When judged that the shutter button has not been depressed, the CPU 11 returns to Step S14 and continues processing for deciding an "imaging area". Conversely, when judged that the shutter button has been depressed, the CPU 11 performs a first imaging processing (temporary imaging) of the imaging area 20 as shown in FIG. 3 (Step S18). Then, the CPU 11 displays a temporarily captured image IMG1 on the image display section 15 and stores it in the DRAM 12 (Step S20).

As a result, the overall subject excluding the photographer himself is captured in the intended imaging area 20. At this time, it may be advantageous in the subsequent positioning processing if an area wider than the viewing angle of the live view (in other words, the "imaging area" described above) is captured and stored by optical zoom and digital zoom being used in combination (an image is displayed that has been captured with optical zoom at a wide angle and digitally zoomed to counteract the optical zoom).

Next, the CPU 11 judges whether or not the shutter button has been depressed again by the photographer (Step S22). When judged that the shutter button has not been depressed, the CPU 11 waits until the shutter button is depressed. After checking the temporarily captured image, the photographer sets the camera on a suitable surface (such as on a desk) such that the camera is pointed substantially at the photographic subject as indicated by reference numeral 21 in FIG. 3, and depresses the shutter button again. Then, the photographer moves to the subject side and enters the imaging area. Reference numeral 22 in FIG. 3 shows the positional relationship between the digital camera 1 and the photographic subject at this point.

When judged that the shutter button has been depressed, the CPU 11 starts the countdown of the self-timer (Step S24) and moves the optical zoom further to the wide-angle side than that during the temporary imaging (Step S26). Next, the CPU 11 then judges whether or not the self-timer has reached time up (Step S28). When judged the self-timer has reached time up, the CPU 11 performs a second imaging processing (actual imaging) (Step S30), and stores an actually captured image IMG2 in the DRAM 12 (Step S32), as shown in FIG. 3. As a result of the optical zoom being moved to the wide-angle side before the second imaging processing, the "imaging area" can be included within the viewing angle even if the position and the direction of the digital camera 1 are different from those during the temporary imaging.

At this time, if rotation is included in geometrical transform described hereafter, the surface on which the digital camera 1 is set may be a tilted surface. That is, all that is required is that the digital camera 1 is pointed substantially at the photographic subject.

Next, the CPU 11 performs positioning processing (including clipping) between the temporarily captured image IMG1 and the actually captured image IMG2 (Step S34). Specifically, as shown in FIG. 3, the CPU 11 detects correspondences between their feature points (black points in FIG. 3) by invariant features (scale-invariant feature transform [SIFT], speed up robust features [SURF] and the like) and determines geometric transformation parameters between the temporarily captured image IMG1 and the actually captured image IMG2 (positioning) by robust fitting such as random sample consensus (RANSAC), while removing outliers. Next, the CPU 11 clips an image IMG3 of the "imaging area" defined by the temporarily captured image IMG1 from the actually captured image IMG2. In the example in FIG. 3, the positioning processing is performed with the people positioned on both sides as the feature points among the people serving as photographic subjects in the IMG1 and IMG2. Then, the CPU 11 displays the clipped image IMG3 on the image display section 15, and stores it in the DRAM 12 (Step S36). The temporarily captured image IMG1 and the actually captured image IMG2 are deleted as required after confirmation with the user.

As a result of this configuration, even when the digital camera 1 is being pointed substantially at the subject side, an image of an "imaging area" determined during temporary imaging, or in other words, an image in which all people to be captured are included, such as a group photograph, can be easily and unfailingly acquired.

Note that the feature points may be taken indiscriminately from a foreground (photographic subject) area or a background area as shown in "positioning" in FIG. 3. Because the foreground (photographic subject) area changes due to the movement of people, or a parallax error occurs between the foreground and the background, it is preferable that a large allowable error for fitting is set, and a geometric model with a small degree of freedom is used.

For example, by a geometric model of Euclidean similarity transformation, a Euclidean similarity transformation coefficient can be determined by which an actually captured image is overlapped with the position, direction, and scale of a temporarily captured image with minimal error. The CPU 11 performs geometric transformation to match the actually captured image IMG2 with the temporarily captured image IMG1, in accordance with the determined transformation parameters. At this time, the CPU 11 deletes an outer area set in the "imaging area" of the temporarily captured image IMG1. As a result, the image (outputted image) IMG3 is acquired that is the "imaging area" of the temporarily captured image IMG1 which has been clipped from the actually captured image IMG2.

As described above, it is advantageous for the positioning if a configuration is applied in which a temporary image that is wider than the "imaging area" is captured when the temporary image IMG1 is captured. Especially in the case of a group photograph, the "imaging area" is assumed to be filled with people. In this case, because the people move (especially when the photographer enters the imaging area), positioning failures occur relatively often. However, if feature points other than those of people are increased, correct feature correspondence (inliers) also increases. Accordingly, the above-described configuration is advantageous. Note that, in a rare case where the parallax between the two images is large as a result of the movement of the digital camera 1, a poor result may be acquired due to its unnecessary background. Therefore it is more preferable that the above-described configuration is selectively applied manually or automatically (a wide area is used only when the number of inliers is significantly large). Also, there is a case where an overlapped area of a temporarily captured image and an actually captured image is insufficient and therefore the image cannot be clipped. However, if a large margin has been set by wide-angle imaging, the positioning processing itself can be performed. Therefore, this is advantageous in that, when an error message such as "move camera slightly to the right (left, up, down, and the like)" is to be displayed, the judgment of "right (left, up, down, and the like)" can be more robustly performed.

In addition, a configuration may be adopted in which, when the geometrical model fitting fails (there are not enough inliers) at Step S34 in FIG. 2, the CPU 11 judges that the image of the imaging area 20 does not fit within the viewing angle of the actually captured image IMG2, sets the zoom to a further wider angle at Step S26, and performs the overall actual imaging processing again.

Second Embodiment

Next, a second embodiment of the present invention will be described.

The structure of the digital camera 1 is the same as that in FIG. 1, and so explanation thereof is omitted.

Figure 4:
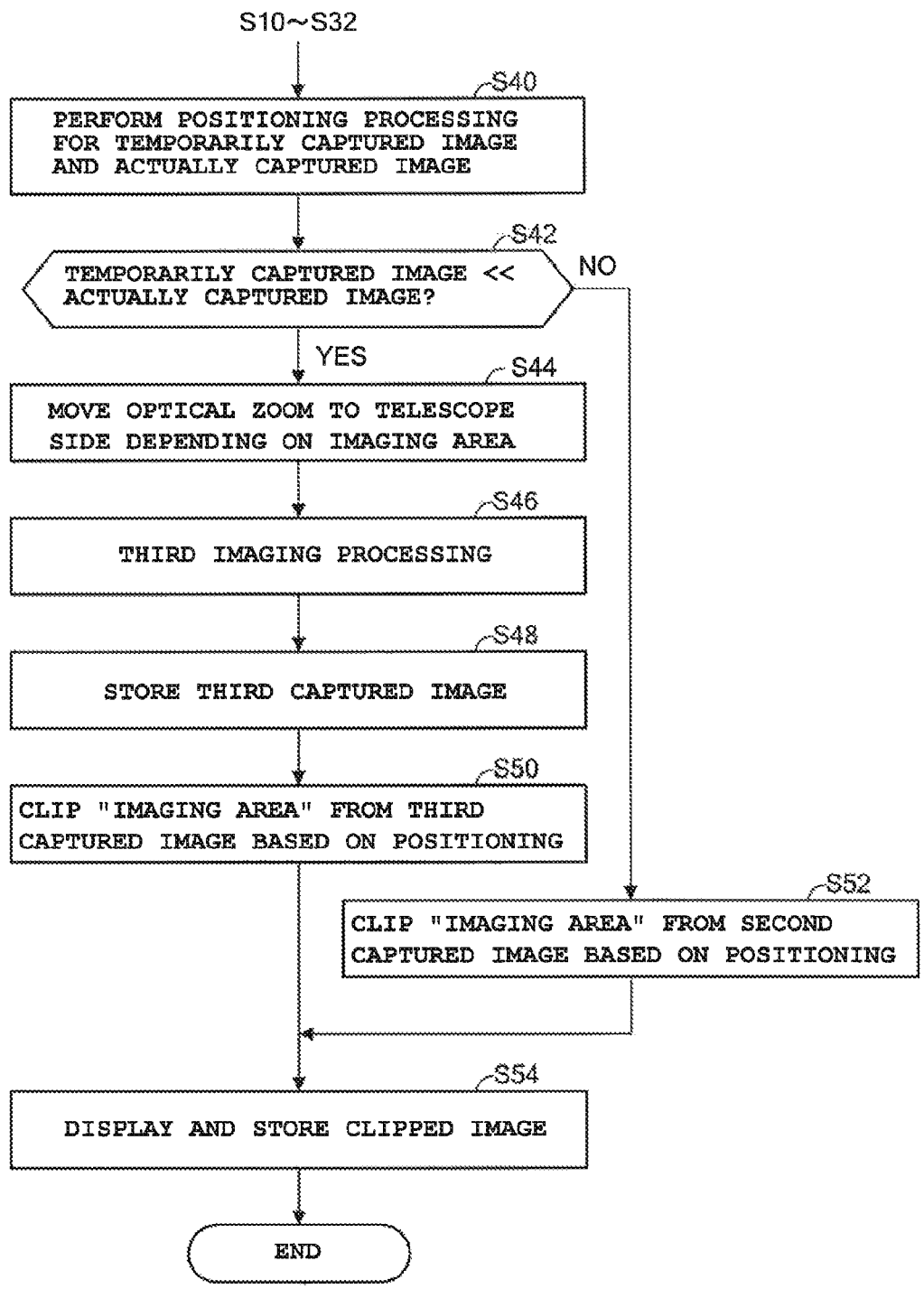
FIG. 4 is a flowchart for explaining operations of a digital camera according to a second embodiment.

FIG. 4 is a flowchart for explaining operations of the digital camera 1 according to the second embodiment. Step S10 to Step S32 in FIG. 4 are the same as Step S10 to Step S32 in FIG. 2, and so explanation thereof is omitted. In the second embodiment, after performing the positioning processing between the temporarily captured image and the actually captured image at Step S40, the CPU 11 judges whether or not the temporarily captured image is sufficiently within the inner edge of the actually captured image (Step S42).

Then, when judged that the temporarily captured image is sufficiently within the inner edge of the actually captured image, the CPU 11 moves the optical zoom to the telescope side depending on the imaging area (Step S44), and after performing third imaging processing (Step S46), stores a third captured image in the DRAM 12 (Step S48). As a result, an image having more pixels=higher resolution than the second captured image can be acquired while including the "imaging area" within the viewing angle.

In this instance, because the geometric transformation (simply expansion transformation) between the second and third captured images is already known from the amount of zoom, the geometric transformation between the temporarily captured image and the re-captured image can be derived and a clipped image can be similarly acquired from the re-captured image, without the feature correspondence processing being performed again (although it may be performed). Accordingly, the CPU 11 clips the temporarily captured image ("imaging area") from the third captured image based on a result of positioning (Step S50). Then, the CPU 11 displays the clipped image on the image display section 15, and stores the clipped image in the DRAM 12 (Step S54). The temporarily captured image IMG1 and the actually captured image IMG2 are deleted as required, after confirmation with the user.

As a result of this configuration, even when the digital camera 1 is being pointed substantially at the subject side, an image of an "imaging area" determined during temporary imaging, or in other words, an image in which all people to be captured are included, such as a group photograph, can be easily and unfailingly acquired with a higher resolution.

At Step S42, when judged that the temporarily captured image is not sufficiently within the inner edge of the actually captured image, the CPU 11 clips the temporarily captured image from the actually captured image (Step S52), and after displaying the clipped image on the image display section 15, stores it in the DRAM 12 (Step S54), as in the case of the first embodiment described above. As a result, even when the digital camera 1 is being pointed substantially at the subject side, an image of an "imaging area" determined during temporary imaging, or in other words, an image in which all people are included, such as a group photograph including the photographer, can be easily acquired.

Variation Examples

Next, variation examples of the present invention will be described.

On the assumption that the distance between the camera and its photographic subject barely changes between temporary imaging and actual imaging, the difference of the zooms may be absorbed by the image size being converted to accord with the optical zoom setting value, and the geometric transformation model may be limited to Euclidean congruence transformation or parallel movement. In this case, block matching where the scale invariance is poor and the like may be applied for feature point correspondence, instead of SIFT, SURF, and the like.

In addition, a planar projection transformation model can be used as the geometric model. In this case, even tilt deformation due to the difference of camera setting directions between temporary imaging and actual imaging can be corrected to a certain extent. However, when the number of outliers is large, an unnatural result is produced if an error is large. Therefore, the planar projection transformation model should be selectively used such that it is used only when a sufficient number of inliers can be found even if the planar projection transformation model is fitted.

Figure 5A:
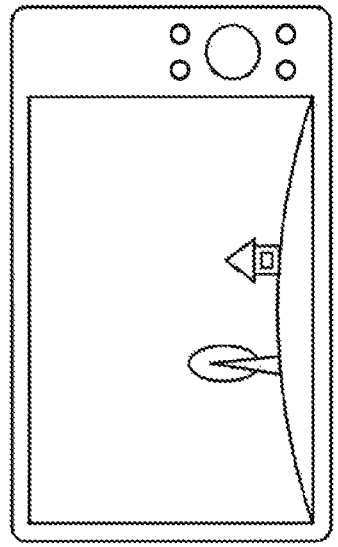
FIG. 5A to FIG. 5D are conceptual diagram for explaining a variation example (variation example of imaging area designation) of the present invention.
Figure 5B:
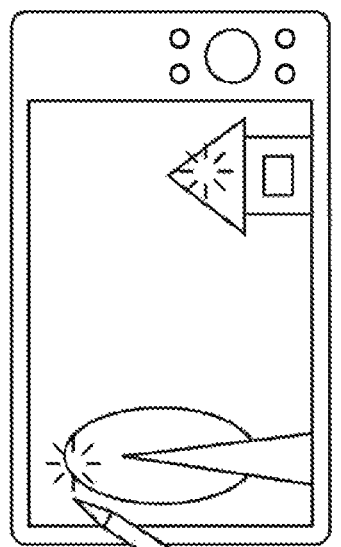
Figure 5C:
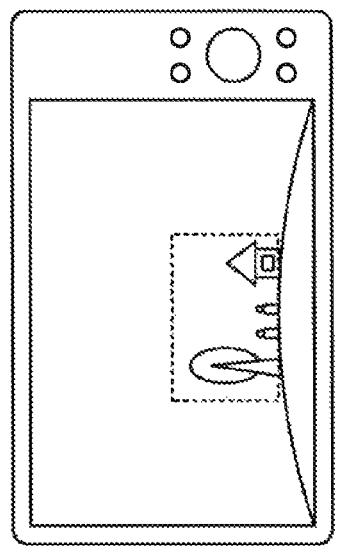
Figure 5D:
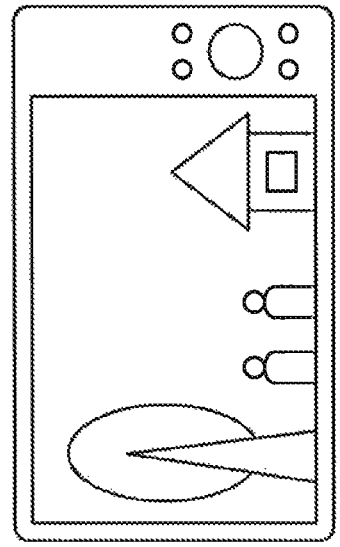

In the above-described first and second embodiments, the digital camera 1 is configured such that a temporary image is captured and whereby an image of a set "imaging area" is acquired. However, the present invention is not limited thereto, and a configuration may be adopted in which the user holds the digital camera 1 and determines its direction, performs zooming by the digital zoom from live-view display on the wide-angle side (FIG. 5A), designates an edge (viewing angle) of the "imaging area" using a touch panel (not shown) provided on the image display section 15 (FIG. 5B), and places the digital camera 1 on an appropriate location and starts the self-timer; and the digital camera 1 identifies the "imaging area" from the designated point (FIG. 5C), automatically zooms (corrects the angle if necessary) such that the "imaging area" covers the image viewing angle (to the extent that the "imaging area" is not enlarged beyond the image viewing angle), and captures the image (FIG. 5D), whereby the image of the "imaging area", which is an image such as a group photograph that includes all people to be captured, can be easily and unfailingly acquired.

Also, in the above-described first embodiment, the digital camera 1 is configured such that, when the user sets an imaging area, and imaging by the self-timer is performed, the image viewing angle is controlled based on the set imaging area, and an image captured. Therefore, by holding the digital camera 1 and setting an imaging area in advance, the user can easily automatically capture an image within the intended imaging area without a tripod, even if self-timer imaging is performed with the digital camera 1 being placed on a desk or the like, and the direction being shifted. That is, the viewing angle setting (imaging area setting) of the self-timer can be easily and intuitively performed, and the degree of freedom of a camera setting location can be increased. Additionally, even in locations where conventionally only a cut-and-try approach could be attempted, self-timer imaging can be successfully performed in a single attempt. Moreover, even when the photographer himself is not a photographic subject, since image capturing can be performed with the digital camera 1 being placed on a stable location such as a desk, camera shake can be prevented even without a tripod.

In addition, the digital camera 1 is configured to compare the feature points of an image of a set imaging area and the feature points of an image captured by controlling the image viewing angle. Therefore, an image of a set imaging area can be unfailingly acquired.

Moreover, the digital camera 1 is configured to acquire an image of an imaging area by capturing a temporary image of an area wider than the imaging area, capturing an actual image by controlling the image viewing angle based on the imaging area, and comparing the feature points of the temporary image of the area wider than the imaging area and the feature points of the actual image so as to identify the imaging area within the actual image. As a result, an image of an intended imaging area can be acquired more accurately.

Furthermore, the digital camera 1 is configured to, when performing image capturing by controlling the image viewing angle, capture an actual image by setting the optical zoom further to the wide-angle side than that during imaging area setting, and clip an image corresponding to the set imaging area from the actual image captured with the optical zoom set on the wide-angle side. Therefore, even when the digital camera 1 is set on a desk or the like and the direction is shifted, an image of an intended imaging area can be acquired.

Still further, the digital camera 1 is configured to, when an image of an imaging area cannot be acquired from a captured actual image, re-capture an actual image by setting the optical zoom further to the wide-angle side, and clip an image corresponding to the set imaging area from the actual image re-captured with the optical zoom set on the wide-angle side. Therefore, even when the digital camera 1 is set on a desk or the like and the image viewing angle is significantly shifted from a set imaging area, an image of the intended imaging area can be unfailingly acquired.

Yet still further, the digital camera 1 is configured to, when performing image capturing using the self-timer, perform image capturing by setting the optical zoom to the telescope side to the extent that a set imaging area is included within the image viewing angle if a temporary image of the set imaging area is sufficiently narrower than an actual image. Therefore, a higher quality image of an intended image area can be acquired.

Yet still further, the digital camera 1 is configured such that the setting of an imaging area can be operated and designated by the touch panel provided on the image display section 15. As a result, imaging areas can be more specifically designated.

Yet still further, the digital camera 1 is configured to confirm whether or not to store a captured image after imaging. Therefore, the unnecessary storage of failed captured images can be prevented.

Yet still further, in the above-described embodiments, the present invention has been applied to a digital camera as an imaging apparatus. However, the present invention may be applied to a mobile phone, a desk-top electronic calculator, a wristwatch, a personal computer (laptop computer), a personal digital assistant (PDA), a music player, and the like having an imaging function.

Yet still further, the "devices" or the "units" described in each of the above-described embodiments are not required to be in a single housing, and may be separated into a plurality of housings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An imaging apparatus capable of imaging using a self-timer, comprising:
   an imaging section including an optical zoom lens;
   an imaging area setting section which sets an imaging area based on operation of the optical zoom lens by a user, before performing imaging using the self-timer;
   an imaging control section which controls the imaging section to capture an actual image using the optical zoom lens, by setting the optical zoom lens further to a wide-angle side than during setting of the imaging area by the imaging area setting section, when the imaging using the self-timer is performed; and
   an image storing section which clips an image corresponding to the imaging area set by the imaging area setting section from the actual image captured by control of the imaging control section, and stores the clipped image as a new image.

2. The imaging apparatus according to claim 1, further comprising:
   an image processing section which compares feature points of the imaging area set by the imaging area setting section and feature points of the captured actual image captured by control of the imaging control section, thereby defining the imaging area within the captured actual image,
   wherein the image storing section clips the image of the imaging area defined by the image processing section from the captured actual image, and stores the clipped image as a new image.

3. The imaging apparatus according to claim 2, wherein:
   the imaging control section controls the imaging section to capture a temporary image of the imaging area; and
   the image processing section compares feature points of the temporary image and feature points of the captured actual image, thereby defining the imaging area within the captured actual image.

4. The imaging apparatus according to claim 3, wherein an area of the captured actual image is wider than the imaging area set by the imaging area setting section.

5. The imaging apparatus according to claim 1, wherein the imaging control section controls the imaging section to re-capture the actual image by setting the optical zoom lens further to the wide-angle side, when the image corresponding to the imaging area is not able to be acquired from the captured actual image; and
   wherein the image storing section clips the image corresponding to the imaging area set by the imaging area setting section from the actual image re-captured by control of the imaging control section by setting the optical zoom lens further to the wide-angle side.

6. The imaging apparatus according to claim 1, wherein the imaging control section, when the imaging area set by the imaging area setting section is narrower than an imaging area of an image captured by controlling an image viewing angle of the imaging section based on the set imaging area, sets the optical zoom lens to a telescope side to an extent that the set imaging area is included within the image viewing angle.

7. The imaging apparatus according to claim 1, further comprising:
   a display section which displays an image captured by the imaging section; and
   a touch panel provided on a surface of the display section;
   wherein the imaging area setting section sets the imaging area based on a user operation performed on the touch panel provided on the surface of the display section.

8. The imaging apparatus according to claim 1, further comprising:
   a confirmation section which confirms whether or not a new image is to be stored by the image storing section.

9. An imaging method using a self-timer in an imaging apparatus including an imaging section including an optical zoom lens, the method comprising:
   an imaging step of performing imaging by the imaging section;
   an imaging area setting step of setting an imaging area based on operation of the optical zoom lens by a user, before performing imaging using the self-timer;
   an imaging control step of controlling the imaging section to capture an actual image using the optical zoom lens, by setting the optical zoom lens further to a wide-angle side than during setting of the imaging area in the imaging area setting step, when the imaging using the self-timer is performed; and
   an image storing step of clipping an image corresponding to the imaging area set by the image area setting step from the actual image captured by control of the imaging control step, and storing the clipped image as a new image.

10. A non-transitory computer-readable storage medium having stored thereon a program that is executable by a computer in an imaging apparatus which includes an imaging section including an optical zoom lens and which is capable of imaging using a self-timer, the program being executable by the computer to perform functions comprising:

imaging processing for performing imaging by the imaging section;

imaging area setting processing for setting an imaging area based on operation of the optical zoom lens by a user, before performing imaging using the self-timer;

imaging control processing for controlling the imaging section to capture an actual image using the optical zoom lens, by setting the optical zoom lens further to a wide-angle side than during setting of the imaging area by the imaging area setting processing, when the imaging using the self-timer is performed; and image storing processing of clipping an image corresponding to the imaging area set by the image area setting processing from the actual image captured by control of the imaging control processing, and storing the clipped image as a new image.

* * * * *